United States Patent
Chen

(10) Patent No.: US 7,668,518 B2
(45) Date of Patent: Feb. 23, 2010

(54) PRIORITY AND LOAD COMBINATION BASED CARRIER ASSIGNMENT IN A MULTI-CARRIER WIRELESS COMMUNICATION SYSTEM

(75) Inventor: Yong Chen, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 658 days.

(21) Appl. No.: 11/376,992

(22) Filed: Mar. 16, 2006

(65) Prior Publication Data

US 2007/0218913 A1    Sep. 20, 2007

(51) Int. Cl.
*H04B 1/18* (2006.01)
(52) U.S. Cl. ............... 455/166.2; 455/435.3; 455/512; 455/527; 370/395.42; 370/412; 370/444; 370/461
(58) Field of Classification Search ............ 455/436, 455/445, 450, 452.2, 453; 370/328, 329, 370/331, 335, 341, 342, 343, 345, 431
See application file for complete search history.

(56) References Cited

U.S. PATENT DOCUMENTS 7,382,782 B1 *   6/2008   Ferguson et al. ....... 370/395.41
2002/0057706 A1 *  5/2002  Michiel .................... 370/412
2002/0147020 A1 * 10/2002  Iguchi et al. .............. 455/452
2003/0156558 A1 *  8/2003  Cromer et al. ............. 370/331
2004/0125768 A1 *  7/2004  Yoon et al. ................. 370/331
2007/0218910 A1 *  9/2007  Hill et al. ................... 455/445
2007/0258407 A1 * 11/2007  Li et al. ..................... 370/331

* cited by examiner

*Primary Examiner*—Dwayne Bost
*Assistant Examiner*—Inder P Mehra
(74) *Attorney, Agent, or Firm*—Slater & Matsil, L.L.P.

(57) ABSTRACT

A wireless communication system and method is disclosed. The system and method includes at least one base station controller setting resource allocation priority and producing a carrier loading information request in response to a request made by a mobile unit; a plurality of base stations coupled to at least one base station controller, each of the plurality of base stations operates on a plurality of carriers, at least one candidate base station transceiver of the plurality of base stations receiving the carrier loading information request, determining its carrier loading information, and responding with a carrier loading information response; and the at least one base station controller operating to assign the mobile unit to at least one candidate carrier within the one responding candidate base station of the plurality of base stations based upon both set resource allocation priority and received carrier loading information.

24 Claims, 8 Drawing Sheets

PRIORITY AND LOAD COMBINATION BASED CARRIER ASSIGNMENT IN A MULTI-CARRIER WIRELESS COMMUNICATION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention generally relates to carrier assignment in a wireless communication system. Specifically, the present invention relates to a novel method of assigning carriers dynamically in consideration of priority factors and load conditions for each carrier in a sector for a CDMA2000 wireless communication system.

2. Description of the Related Art

A wireless communication system is generally known to consist of Access Terminals (AT) and a Radio Access Networks (RAN) connecting to a Core Network (CN). The wireless communication system may be operated according to various standards and/or different services. Depending on the standards, or the services provided, the RAN may include a plurality of Base Station Transceivers (BTS) and a Base Station Controller (BSC) or an Access Network Controller (ANC). A BSC or ANC may control a plurality of BTSs. While a BSC is connected to a Mobile Switching Center (MSC) for voice applications, the ANC is connected to a Packet Control Function (PCF) which in turn is connected to the Packet Data Serving Node (PDSN) for packet data communications. A MSC may be interconnected to other MSCs or to the Public Switched Telephone Networks (PSTN). The PDSN may be interconnected to the Internet or a Media Gateway; then to other networks.

The wireless communication system may be operated according to various protocols including, but not limited to, the Code Division Multiple Access (CDMA) protocol, the cdma2000 1x (1x), the cdma 1x Evolution Data Optimized (1xEV-DO), and the Universal Mobile Telecommunications Systems (UMTS). The protocols for the 1x, the 1xEV-DO, and the UMTS are collectively known as the third generation (3G) wireless technologies.

In a CDMA wireless communication system, all the BTSs deployed across a geographical service area can have a same carrier; which is the 1.25 MHz frequency band, with the Walsh codes and other codes distinguishing each user within the CDMA wireless communication system. More carriers can be allocated in the CDMA wireless communication system to increase the capacity by creating overlaying frequency coverage with some terminals serviced on one of the carrier frequencies while others are serviced on other carrier frequencies. This scenario is called a Multi-carrier System, which greatly increases the overall capacity of the system.

User mobility among all the BTSs of the CDMA wireless communication system is achieved through a mechanism called Handoff. The Handoff includes a Soft Handoff, a Softer Handoff, and a Hard Handoff (HHO) in a CDMA wireless communication system as well as a Virtual Handoff in an 1xEV-DO wireless communication system. For a Soft Handoff, the terminal can have multiple sectors as the serving sectors (Active Set) at the same time. In addition, the Active Set may change when the terminal moves from one sector to another sector. A Softer Handoff is a type of Soft Handoff for the sectors within the same cell (BTS). When the terminal moves from one carrier to another carrier, either within the same sector or cross different sectors, a HHO carries out. Unlike a Soft Handoff in which the link with the source does not break when the link with the target is established, a HHO stops the channel with the source then sets up the channel with the target. Therefore a HHO failure may introduce performance degradation such as drop calls, etc.

Therefore, the multi-carrier system is designed and operated in such a way to minimize the number of HHOs in a given voice communication and/or data transmission within the system. The present invention discloses a novel method for allocating the traffic among all the carriers to improve the efficiency of voice communication and/or data transmission in a multi-carrier wireless communication system.

SUMMARY OF THE INVENTION

The present invention discloses a novel carrier assignment algorithm providing a new mechanism for a multi-carrier wireless communication system with the capability of monitoring and optimizing the loading distribution thereby improving the network performance. The algorithm disclosed according to the present invention combines the priority consideration and the load consideration when a carrier assignment is performed. The deployment of the algorithm according to the present invention provides an optimal and flexible solution for performing carrier assignments in a multi-carrier wireless communication system.

An object of the present invention is to ensure the acceptance or a higher probability of acceptance of a new origination call or an incoming HHO call.

Another object of the present invention is to allocate the traffic in a wireless communication system based on combined consideration of priority of carriers and loading conditions.

Yet another object of the present invention is to allow an operator of a wireless communication system flexibility to allocate traffic according to specified requirements for specific applications.

Still another object of the present invention is to effectively reduce the overload of carriers and balance loading among different carries in a wireless communication system.

Therefore, in accordance with the previous summary, objects, features and advantages of the present disclosure will become apparent to a person of the ordinary skill in the art from the subsequent description and the appended claims taken in conjunction with the accompanying drawings.

DETAILED DESCRIPTION

The present disclosure can be described by the embodiments given below. It is understood, however, that the embodiments below are not necessarily limitations to the present disclosure, but are used to describe a typical implementation of the invention.

The present invention provides a unique method and system for priority and load combination based carrier assignment for a multi-carrier wireless communication system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
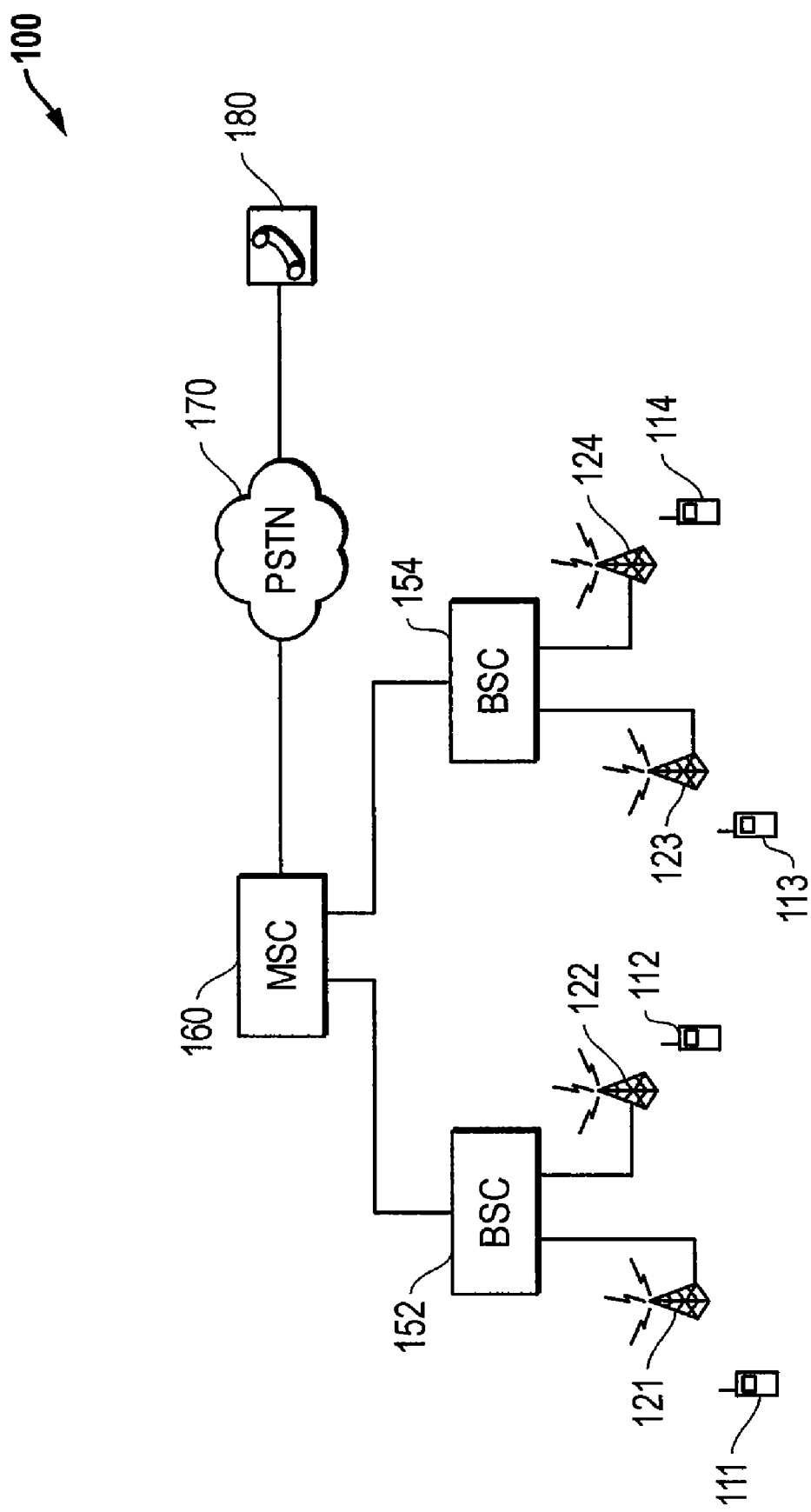
FIG. 1 is a diagram illustrating a construction of a wireless communication system for circuit voice communications according to the present invention.

FIG. 1 illustrates a construction of a wireless communication system 100 operating for circuit voice communications. The wireless communication system 100 includes a mobile switching center (MSC) 160, base station controllers (BSCS) 152 and 154, and a plurality of base stations (BS). Each BS includes an antenna and a base station transceiver (BTS), 121, 122, 123, or 124 as shown in FIG. 1. The MSC 160 communicably connected to a Public Switched Telephone Network (PSTN) 170. The wireless communication system 100 services calls between telephone 180 connected to the PSTN 170 and any of a plurality of mobile unites 111, 112, 113, or 114 operating within the wireless communication system 100. The wireless communication system 100 also services calls among the plurality of mobile units 111, 112, 113, and 114.

Figure 2:
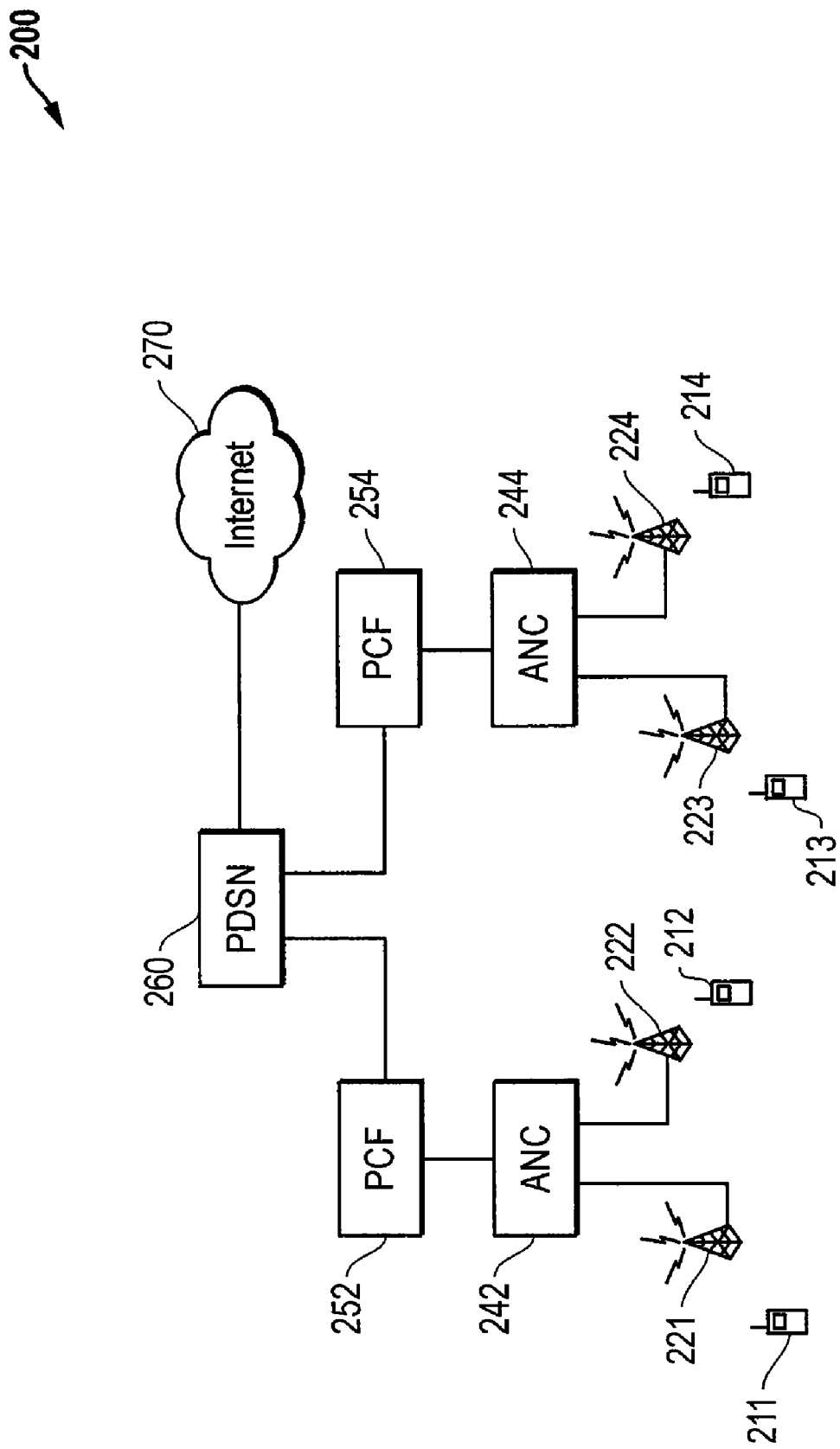
FIG. 2 is a diagram illustrating a construction of a wireless communication system operating for packet data communications according to the present invention.

FIG. 2 illustrates a construction of a wireless communication system 200 operating for packet data communications. The wireless communication system 200 includes a Packet Data Serving Node (PDSN) 260, a plurality of Packet Control Functions (PCFs) 252 and 254, a plurality of Access Network Controllers (ANCs) 242 and 244, and a plurality of BS. Each BS includes an antenna and a BTS, 221, 222, 223, or 224 as shown in FIG. 2. The PDSN 260 is communicably connected to a network of Internet 270. The wireless communication system 200 services packet data transmissions between the network of Internet 270 and any of a plurality of mobile units 211, 212, 213, or 214 operating within the wireless communication system 200. The wireless communication system 200 also services packet data transmissions among the plurality of mobile units 211, 212, 213, and 214.

Figure 3:
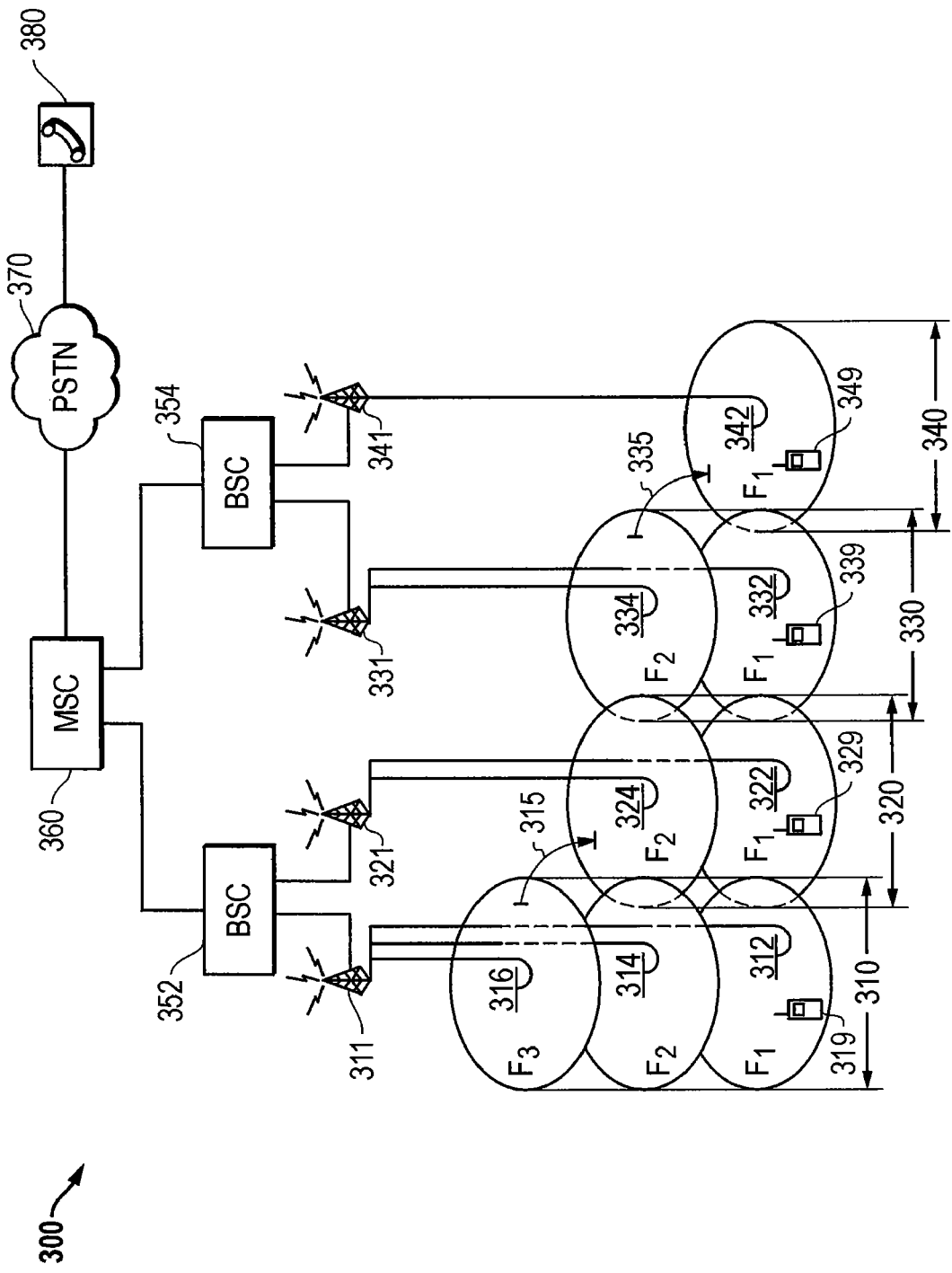
FIG. 3 is a diagram illustrating a wireless communication system with multi-carrier sectors in a plurality of BTSs constructed according to the present invention.

FIG. 3 illustrates a wireless communication system 300 with multi-carrier sectors in a plurality of BTSs constructed according to the present invention. In the illustrated embodiment, the wireless communication system 300 can operate according to a CDMA standard, in particular the CDMA(IS-95), the 1×, the 1×EV-DO standards and the WCDMA (modified as required to accomplish the teachings of the present invention). The principles of the present invention also apply to other wireless communication systems operating according to other standards as well, in which multiple carrier frequencies overlay one another to increase the capacity of the wireless communication system 300. Various network implementations might use slightly different exemplary architectures and different nomenclature according to a wide range of other network standards. As illustrated in FIG. 1 and FIG. 2, and as a person of the ordinary skill in the art will understand, the wireless communication system 300 may be used for circuit voice communication as shown in FIG. 1 and for packet data transmission as shown in FIG. 2. A person of the ordinary skill in the art will understand, the packet data transmission in the wireless communication system 300 may include, but not limited to, Voice over IP (VoIP) applications.

The wireless communication system 300 includes an MSC 360, BSCs 352 and 354, and a plurality of BSs, each of which includes a set of antenna and one or more than one BTS, 311, 321, 331, or 341 as shown in FIG. 3. The MSC 360 couples the wireless communication system 300 to a PSTN 370. The wireless communication system services calls between telephone 380 connected to the PSTN 370, for example, and any of a plurality of mobile units 319, 329, 339 and 349 operating within the wireless communication system 300. The wireless communication system 300 also services calls among the plurality of mobile units 319, 329, 339 and 349.

BS 311 and BS 321 couple to BSC 352, and BS 331 330 and BS 341 couple to BSC 354. The BS 311, 321, 331, and 341 can be constructed such that two or more carriers are supported within the wireless communication system 300. By providing wireless coverage on the two or more carriers, the capacity provided by the wireless communication system 300 is approximately at least double or multiple times that which would be available with a single carrier frequency. As shown in FIG. 3, BS 311 comprises three overlaying carriers 312, 314, and 316, BS 321 comprises two overlaying carrier frequencies 322 and 324, BS 331 comprises two overlaying carriers 332 and 334, and BS 341 comprises one carrier 342. Within the wireless communication system 300, sector 310 overlaps with sector 320, sector 320 overlaps with sector 330, and sector 330 overlaps with sector 340. Furthermore, carriers 312, 322, 332, and 334 possess a same frequency, designated as F1, carriers 314, 324, and 334 possess another same frequency, designated as F2, and carrier 316 possesses yet another frequency, designated as F3. The multiple carriers within the same sector, such as 334, 332, may be transmitted through the same antenna set of the same BS 331. A person of the skill in the art will understand, these overlaying frequency design and overlapping architecture may vary according to specific needs of wireless communication demand in different areas.

A BTS may refer to the base station transceiver of each carrier. A BTS described according to the present invention is equivalent to a specific sector with a specific carrier to a BSC. Such a specific sector with a specific carrier is defined as a Sector-carrier. For example, for a three sector site with three carriers, there are nine sets of sector-carriers, or equivalently, base station transceivers (nine distinguished cell IDs) communicably connected to a BSC. In commercial networks, a "BTS" may refer to a physical cabinet containing the base station transceivers with one or multiple carriers.

Figure 4:
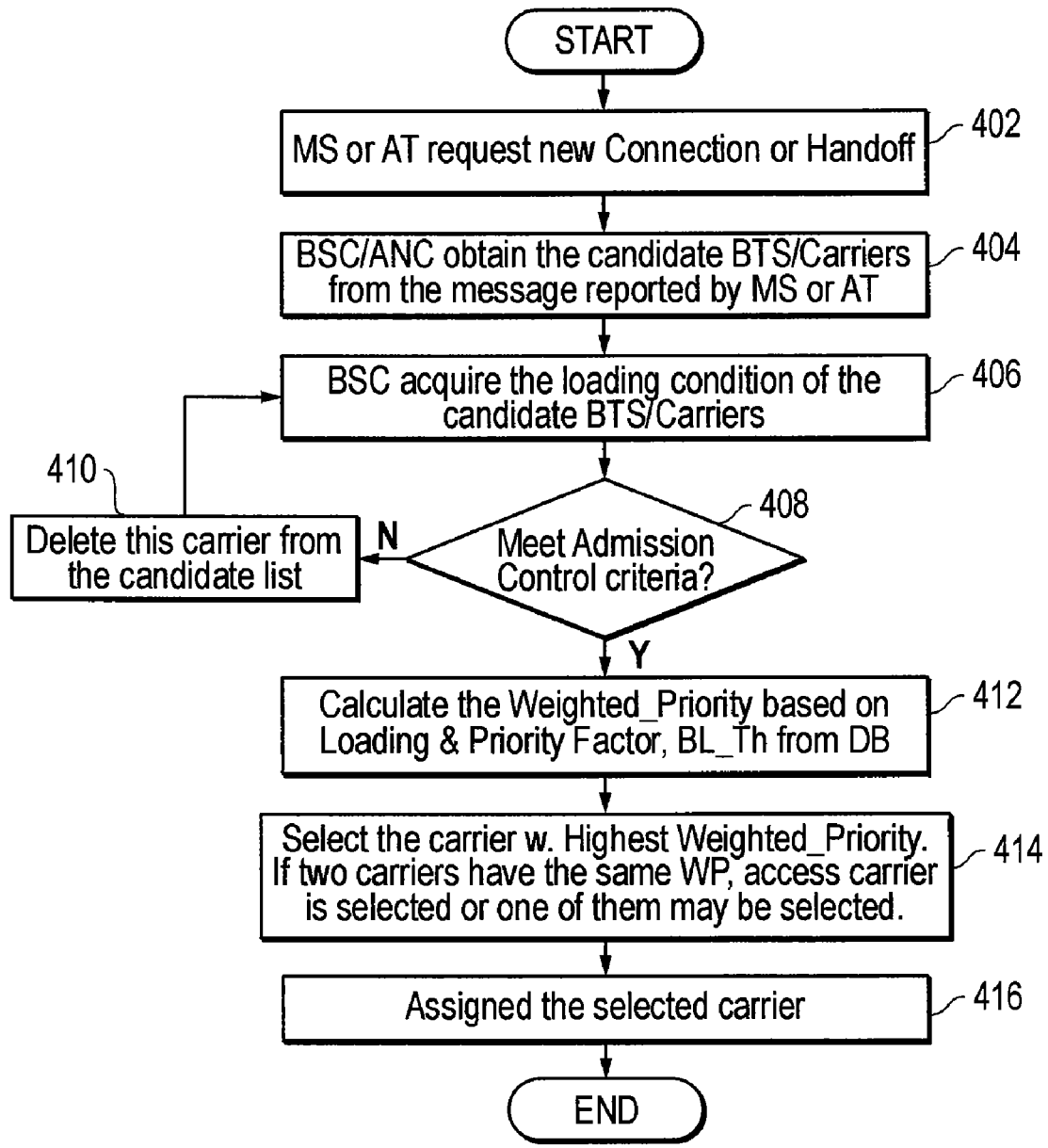
FIG. 4 is a logic diagram illustrating an operation of dynamically balancing traffic serviced by a multi-carrier wireless communication system according to the present invention.

FIG. 4 illustrates operation 400 dynamically balancing traffic serviced by a wireless communication system according to the present invention. Operation 400 commences at step 402 wherein the wireless communication system receives a new connection or a handoff request from a mobile station (MS) or an access terminal (AT). The handoff request would typically be indicated in the form of a pilot strength measurement message (PSMM) in an 1× system and a RouteUpdate Message in an 1×EV-DO system in which the mobile unit reported the pilot signals, based on which the network decides to add particular pilot(s) to its active set. A person of the ordinary skill in the art will understand, other messages may be generated for the handoff request depending on a wide range of standards employed in different wireless communication systems.

Next, at step 404, the candidate sector-carriers (equivalent to BTS) are determined from the PSMM or the RouteUpdate Message and the database related to the serving sector. Once all candidate Sector-carriers have been identified, the BSC or the ANC (see FIG. 1 and FIG. 2) sends a loading condition request to each candidate Sector-carrier. At step 406, the BSC acquires loading condition reports from each candidate Sector-carrier. Upon obtaining the loading condition of each candidate Sector-carrier, then operation moves to step 408, where the BSC determines whether each candidate Sector-carrier meets Admission Control criteria. If a Sector-carrier does not meet the Admission Control criteria, then the operation goes to step 410 where the BSC deletes the Sector-carrier. Upon the deletion of the Sector-carrier, the operation goes back to step 406. If a candidate Sector-carrier meets the Admission Control criteria, then the operation proceeds to step 412, where the BSC implements the algorithm according to the present invention to dynamically assign the communication to a selected carrier. The following definitions and equations are used in one embodiment to determine a balancing factor of the priority and the loading condition for each selected carrier.

Definitions:

Priority Factor: A factor, datafilled for each carrier, not only represents the priority level but also provides the proportion of the relative loading condition. The higher the value, the higher priority and the higher accommodated loading at the carrier. The range for a Priority Factor is recommended to be set between 0 and 100 (%).

BL_Th: Base Loading Threshold. A threshold, datafilled for each sector, defines effectively the line for two different carrier assignment operations: 1) when the carrier loading at the sector is below this threshold, the carrier with higher priority is always assigned; and 2) when the carrier loading is above this threshold, the loading balance according to the relative Priority Factors between the carriers takes effect. Its range is between 0% and 100%, and the default may be set to 40%.

With the input of these parameters, the Weighted Priority of a specific carrier F1 at the sector is calculated based on the following formula:

$$\text{Weighted Priority}(F1) = \frac{\text{Normalized } PriorityFactor(F1)}{\max\{e, CurrentLoading(F1) - BL\_Th\}} \quad (1)$$

Where, e is a small positive number. And the Priority Factors are normalized among all the active carriers within the same sector:

$$\text{Normalied } PriorityFactor(F1) = \frac{PriorityFactor(F1)}{\sum_f PriorityFactor(f)} \times 100 \quad (2)$$

Where, f=F1, F2, F3, . . . all carriers within the same sector.

At step 414, upon calculating the Weighted_Priority for each carrier in each sector, the BSC selects the carrier with the highest Weighted_Priority, and then proceeds to step 416 to assign the carrier. If, at step 414, there are two carriers with the same highest Weighted_Priority, then the BSC at step 416 will assign the one at which the terminal is sending the access channel to the BS.

Figure 5:
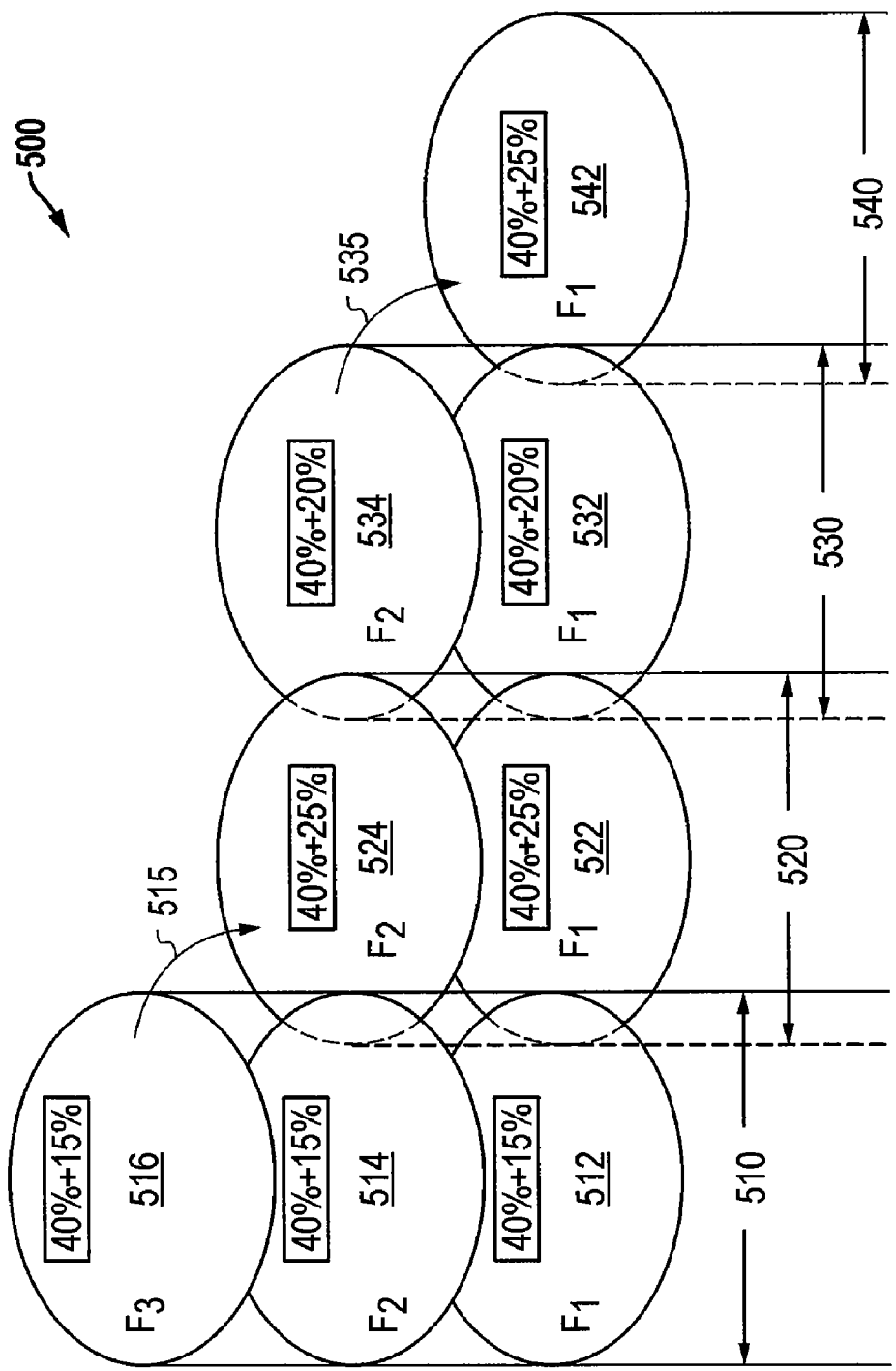
FIG. 5 illustrates an example of the existing algorithm for allocation signal traffic or data communication in a multi-carrier wireless communication system.
Figure 6:
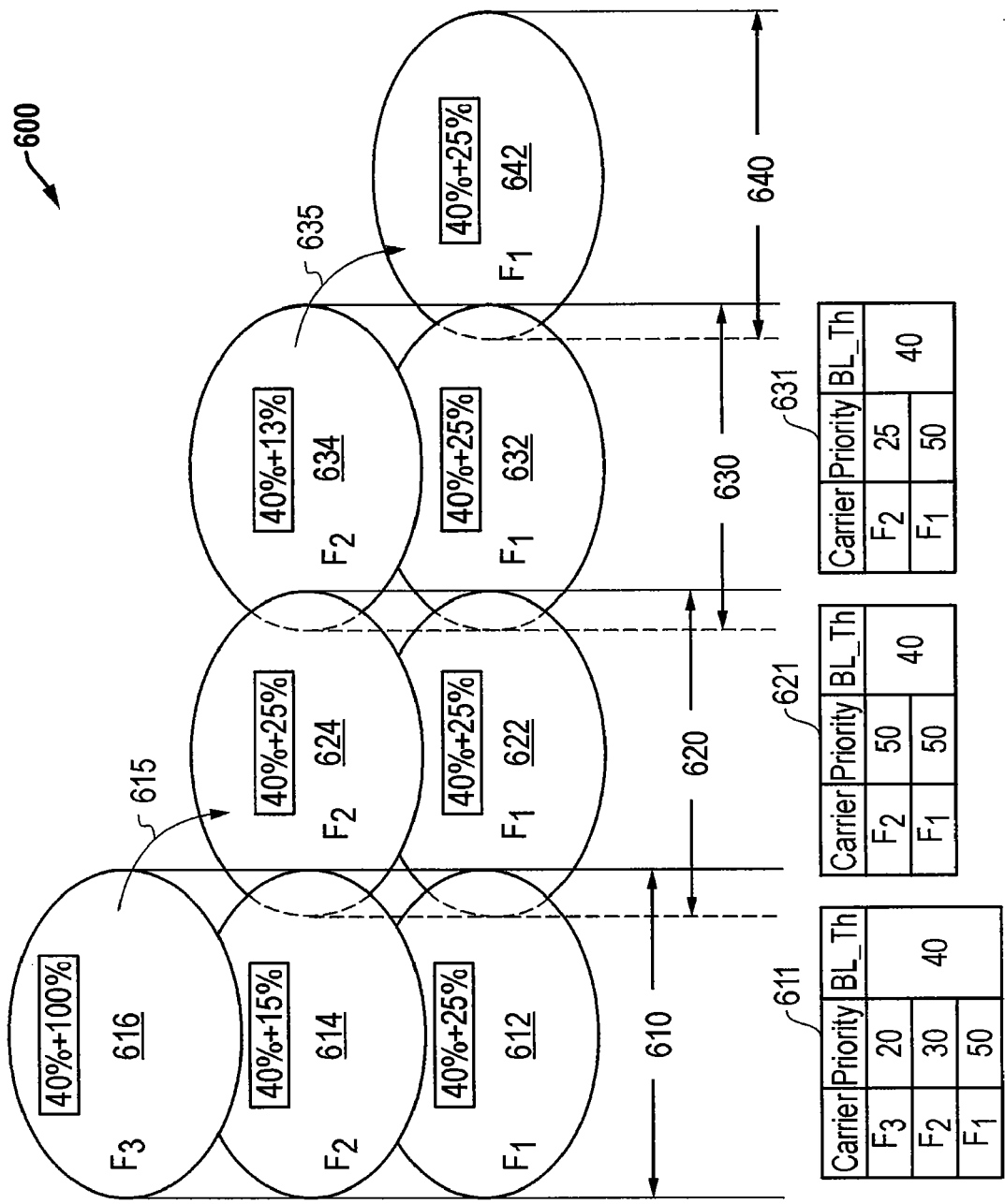
FIG. 6 illustrates an example of the algorithm according to the present invention for allocation of signal traffic or data communication in a multi-carrier wireless communication system.

FIGS. 5 and 6 together illustrate the advantage of implementing the algorithm of the present invention in a wireless communication system. FIG. 5 illustrates an example of the existing algorithm for allocation signal traffic or data communication in a wireless communication system, and FIG. 6 illustrates an example of the algorithm for allocation of signal traffic or data communication in a wireless communication system according to the present invention. FIGS. 5 and 6 only show overlaying carriers in each sector in a wireless communication system 500 or 600. The actual architecture designs for the wireless communication system 500 or 600 may be the same as shown in FIG. 3. Referring now to FIG. 5, an example of the existing algorithm for allocation of signal traffic or data communication in a wireless communication system is illustrated. In FIG. 5, Sector 510 comprises three overlaying carriers 512, 514, and 516, Sector 520 comprises two overlaying carriers 522 and 524, Sector 530 comprises two overlaying carriers 532 and 534, and Sector 542 comprises one carrier 542. Within the wireless communication system 500, sector 510 overlaps with sector 520, sector 520 overlaps with sector 530, and sector 530 overlaps with sector 540. Furthermore, carriers 512, 522, 532, and 534 possess a same frequency, designated as F1, carriers 514, 524, and 534 possess another same frequency, designated as F2, and carrier 516 possesses yet another frequency, designated as F3. A person of the skill in the art will understand, this overlaying frequency design and overlapping architecture may vary according to specific needs of wireless communication demand in different areas.

In FIG. 5, a Carrier Assignment algorithm applies Priority and Load separately. A hard assignment threshold, as shown in FIG. 5, is set at 40% of a traffic loading. A person of the ordinary skill in the art will understand, the hard assignment threshold of the wireless communication system 500 may be set in between 0 to 100% of the traffic loading as one operator of the wireless communication system 500 desires. Before the hard assignment threshold is reached, the carrier is assigned only based on Priority to each carrier in the wireless communication system 500; after the hard assignment threshold is reached, that is when the traffic loading exceeds 40% of a total traffic loading in a given sector 510, 520, 530, or 540, the carrier is assigned such that the load of all carriers are evenly balanced and the load level of each carrier can not be controlled. As shown in FIG. 5, the percentage numbers on each carrier refer to the traffic loading. In sector 510, the traffic load of carrier 512, carrier 514, and carrier 516 is evenly assigned when the traffic load exceeds the hard assignment threshold 40%. Therefore, the load of each carrier 512, 514, and 516 is assigned 40+15% (55%), meaning that each carrier is 55% loaded, 15% above the hard assignment threshold 40%.

In a similar fashion, in sector 520, assuming the total traffic load exceeds the hard assignment threshold 40%, the load of carrier 522 and carrier 524 is evenly assigned 40+25% (65%), meaning that each carrier is 65% loaded, 25% above the hard assignment threshold 40%; in sector 530, assuming the total traffic load exceeds the hard assignment threshold 40%, the load of carrier 532 and carrier 534 is evenly assigned 40+20% (60%), meaning that each carrier is 60% loaded, 20% above the hard assignment threshold 40%.

Because the current implementation is incapable of controlling the load of different carriers, it may cause too many HHOs at the boundaries between different carriers. As shown in FIG. 5, a HHO will be performed from carrier 516 to carrier 524 when a traffic instance is carried from carrier 516 to carrier 524. In the same fashion, a HHO will be performed from carrier 534 to carrier 542 when a traffic instance is carried from carrier 534 to carrier 542. Therefore, the highest possible HHOs 515 need to be performed from carrier 516 to 524 is 55% of the total traffic load in carrier 516. In addition, the highest possible HHOs 535 need to be performed from carrier 534 to carrier 542 is 60% of the total traffic load in carrier 534 (Normally the handoff traffic is only a fraction of the total sector traffic). High volume of HHOs may cause a high drop call rate which decreases efficiency and affects the network performance of the wireless communication system 500.

Now referring to FIG. 6, the algorithm according to the present invention provides a new mechanism by combining both Priority and Load into the carrier assignment criteria. The algorithm according to the present invention not only improves the network performance, but also gives the operators flexibility to control traffic distribution. In FIG. 6, BTS 610 comprises three overlaying carriers 612, 614, and 616, BTS 620 comprises two overlaying carriers 622 and 624, BTS 630 comprises two overlaying carriers 632 and 634, and BTS 642 comprises one carrier 642. Within the wireless communication system 600, sector 610 overlaps with sector 620, sector 620 overlaps with sector 630, and sector 630 overlaps with sector 640. Furthermore, carriers 612, 622, 632, and 634 possess a same frequency, designated as F1, carriers 614, 624, and 634 possess another same frequency, designated as F2, and carrier 616 possesses yet another frequency, designated as F3. A person of the skill in the art will understand, this overlaying frequency design and overlapping architecture may vary according to specific needs of wireless communication demand in different areas.

FIG. 6 also shows the resulting loading conditions when the algorithm according to the present invention is implemented. A datafill table for each sector for the Priority Factors and BL_Th are given for each region of the network for illustrative purposes. In FIG. 6, The BL_Th is set to be 40%, the same as the hard assignment threshold set in the FIG. 5.

As shown in FIG. 6, the datafill tables 611, 621, and 631 include the data fill values for a Priority Factor and a BL_Th for each carrier within each sector 610, 620, or 630. In FIG. 6, sector 610 has a Priority Factor of 50(%) for F1, 30(%) for F2, and 20(%) for F3 while BL_Th is set to be 40%; sector 620 has a Priority Factor of 50(%) for F1 and 50(%) for F2 while BL_Th is set to be 40%; and sector 630 has a Priority Factor of 50(%) for F1 and 25(%) for F2 while BL_Th is set to be 40%. A person of the ordinary skill in the art will understand, both the Priority Factor and BL_Th can be set as desired by an operator of the wireless communication system 600.

Now applying equations (1) and (2) set forth previously in the detailed description and implementing the process depicted in FIG. 4 according to the present invention, the traffic load of each carrier 612, 614, and 616 is assigned accordingly over the BL_Th 40%. The Priority Factor of each carrier 612, 614, and 616 is set 50%, 30% and 20% respectively. The resulting traffic allocation based upon the calculated Weighted Priority for each carrier is the following: the load for carrier 612 is 40+25(%) (65%), meaning that carrier 612 is 65% loaded, 25% above the BL_Th 40%; the load for carrier 614 is 40+15(%) (55%), meaning that carrier 614 is 55% loaded, 15% above the BL_Th 40%; and the load for carrier 616 is 40+10(%) (50%), meaning that carrier 616 is 50% loaded, 10% above the BL_Th 40%. The loading allocation for the excess loads above the BL_Th for carriers 612, 614, and 616 are 25%, 15%, and 10% respectively, which correspond proportionally to the Priority Factor for carries 612, 614, and 616, 50(%), 30(%), and 20(%), respectively.

In a similar fashion, in sector 620, the resulting traffic allocation based upon the calculated Weighted Priority for each carrier is the following: the load for carrier 622 is 40+25 (%) (65%), meaning that carrier 622 is 65% loaded, 25% above the BL_Th 40%, and the load for carrier 624 is 40+25 (%) (65%), meaning that carrier 614 is 65% loaded, 25% above the BL_Th 40%.

And in sector 630, the resulting traffic allocation based upon the calculated Weighted Priority for each carrier is the following: the load for carrier 632 is 40+25(%) (65%), meaning that carrier 632 is 65% loaded, 25% above the BL_Th 40%, and the load for carrier 634 is 40+13(%) (53%), meaning that carrier 634 is 53% loaded, 13% above the BL_Th 40%.

As shown in FIG. 6, a HHO will be performed from carrier 616 to carrier 624 when a traffic instance is carried from carrier 616 to carrier 624. In the same fashion, a HHO will be performed from carrier 634 to carrier 642 when a traffic instance is carried from carrier 634 to carrier 642. Therefore, the highest possible HHOs 615 needs to be performed from carrier 616 to carrier 624 is 50% of the total traffic load in carrier 616. In addition, the highest possible HHOs 635 needs to be performed from carrier 634 to carrier 642 is 53% of the total traffic load in carrier 634

Assuming a percentage of HHOs among all calls from carrier 616 to carrier 624 is the same as a percentage of HHOs among all calls from carrier 516 to carrier 624, because the resulted loading condition for carrier 616 in FIG. 6 is 50%, lower than the loading condition for carrier 516 in FIG. 5, 55%, the number of HHOs from carrier 616 to carrier 624 will be lower than the number of HHOs from carrier 516 to carrier 524, given that both the wireless communication systems 500 and 600 use the same hard assignment threshold in that the hard assignment threshold of the wireless communication system 500 is 40% and the BL_Th for the wireless communication system 600 is also 40%. In the same manner, assuming a percentage of HHOs among all calls from carrier 634 to carrier 642 is the same as a percentage of HHOs among all calls from carrier 534 to carrier 542, because the resulted loading condition for carrier 634 in FIG. 6 is 53%, lower than the loading condition for carrier 534 in FIG. 5, 60%, the number of HHOs from carrier 634 to carrier 642 will be lower than the number of HHOs from carrier 534 to carrier 542.

As a result from implementing the algorithm according to the present invention shown in FIG. 6, in comparison with the existing allocation scheme shown in FIG. 5, the loading of the overlay carrier at the sectors near the HHO boundaries are monitored to be lower when the algorithm according to the present invention is applied. Therefore, implementing the algorithm according to the present invention reduces HHOs at the boundaries of different sectors within a wireless communication system. In addition, the present invention provides the flexibility needed by and beneficial to an operator of the wireless communication system, by which the operator can have control of the traffic allocation on each carrier therefore enhancing the network operation and efficiency.

Figure 7:
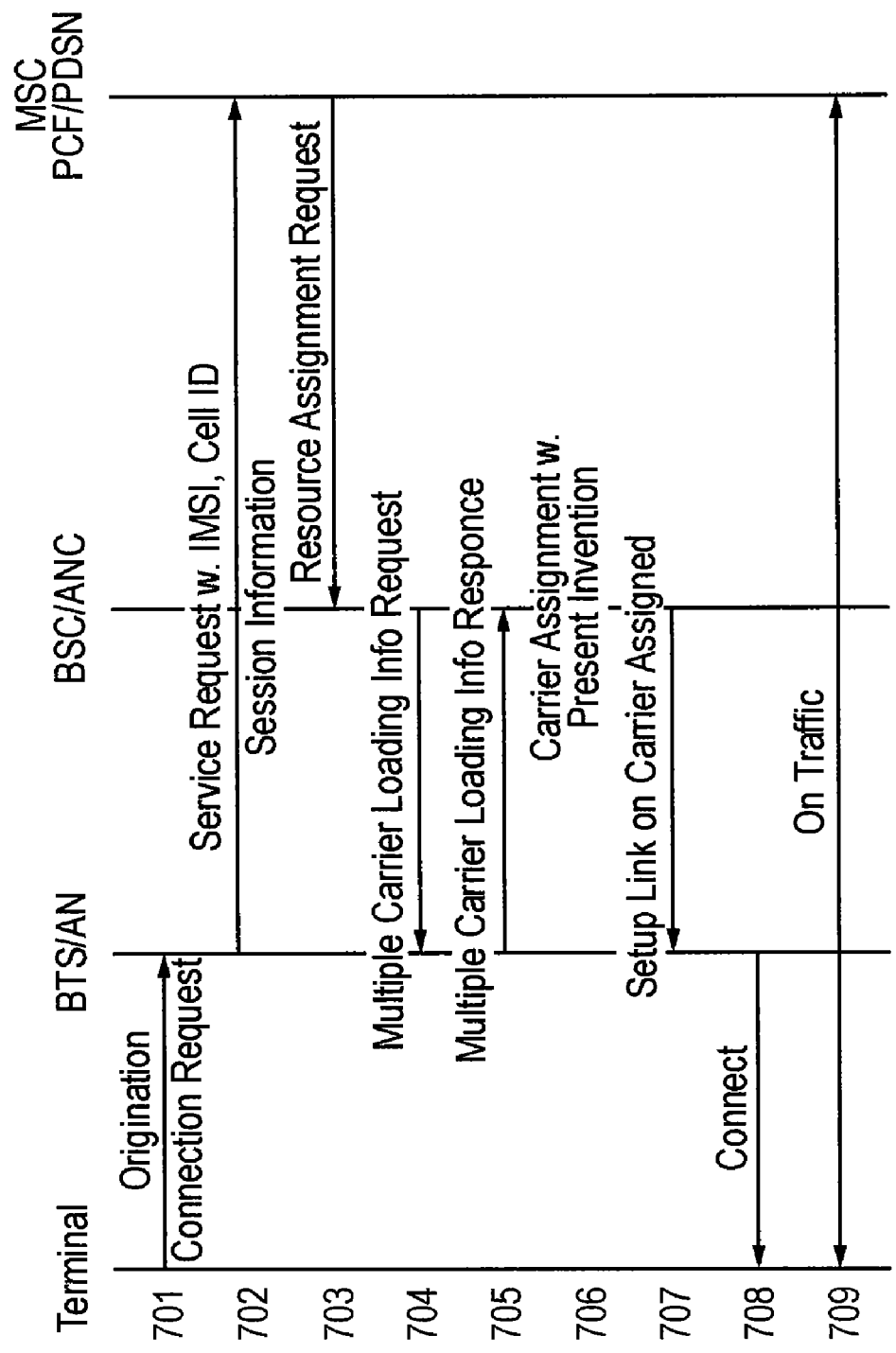
FIG. 7 is a message flow diagram illustrating the messages that pass among the components of a multi-carrier wireless communication system in originating or setting up a connection according to the present invention.

Now referring to FIG. 7, the messages that pass among the components of a wireless communication system in originating or setting up a connection according to the present invention are illustrated. At time 701, the terminal sends a call origination (for MS) or a connection request (for AT) to the BTS or AN of the serving sector at the access frequency. The operational position of the terminal is determined based upon the location of the BTS or AN receiving the request. Then at time 702, the BTS/BSC sends a CM Service Request to the MSC upon receiving the origination message, or the AN/ANC sends the session setup related message to the PCF and PDSN upon receiving the connection request. In response, at time703, the MSC sends a Assignment Request to request radio resources for circuit services; for packet data service, the radio resources may be requested either based on the configuration request sent by the AT or based on the requirement from the PCF/PDSN for the specific application. Then at time 704, the BSC/ANC sends a Loading Information Request to all the candidate carrier-sectors, and at time 705, the BSC/ANC acquires the loading information from the Loading Information Response from these candidate carrier-sectors. At time 706, the BSC/ANC implements the carrier assignment algorithm according to the present invention to select the carrier for the assignment. Then at time 707, the BSC/ANC allocates the resource with the assigned carrier-sector to set up a link. At time 708, the BTS/AN sends a Traffic Channel Assignment to the terminal to establish the connection or call over the air interface. And at time 709, the traffic flows through the established connection.

Figure 8:
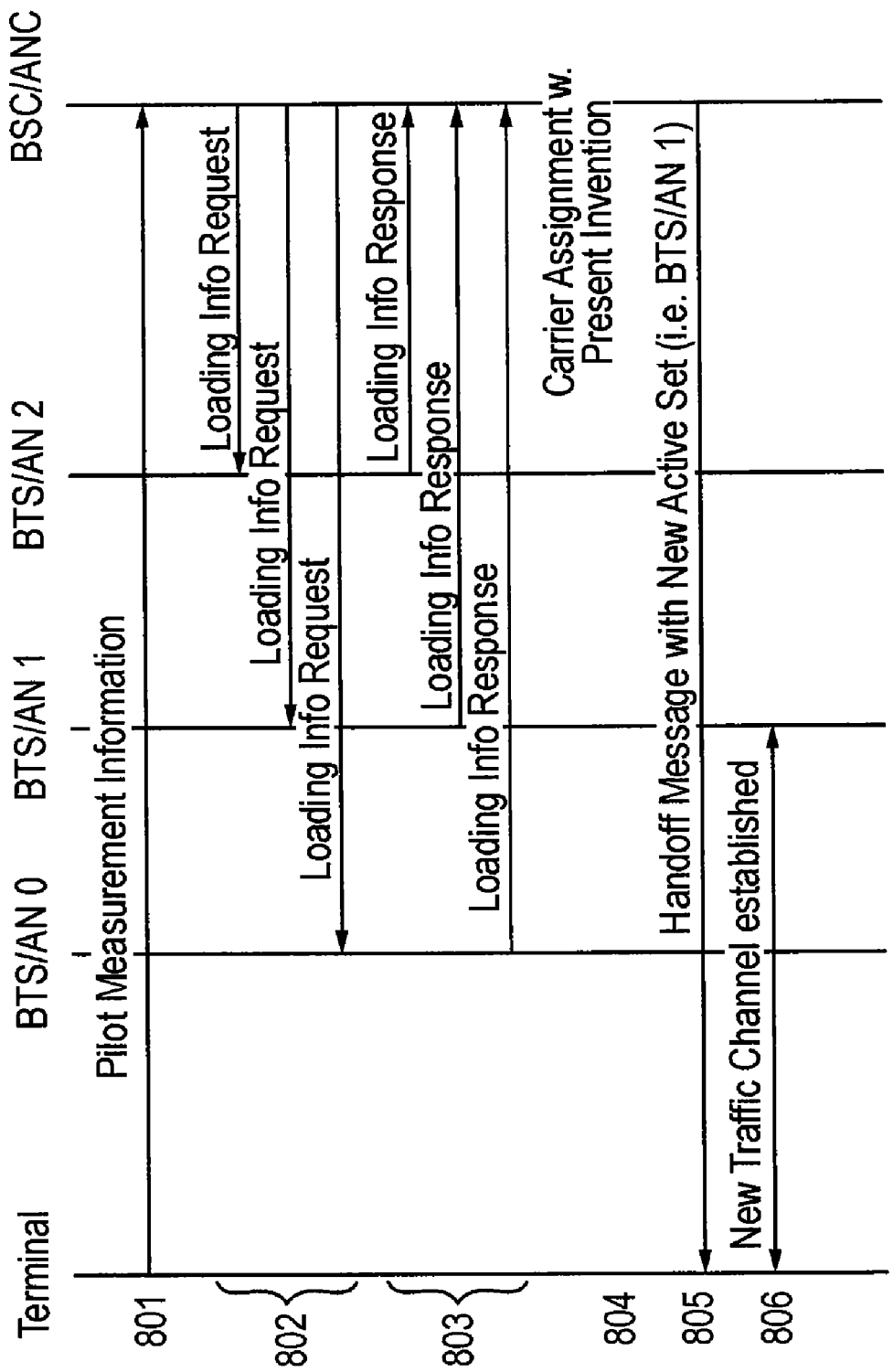
FIG. 8 is a message flow diagram illustrating the message exchanges when a Handoff is carried out within a multi-carrier wireless communication system according to the present invention.

Now referring to FIG. 8, the message exchanges when a Handoff is carried out within a wireless communication system according to the present invention is illustrated. At time 801, the terminal sends a Pilot Measurement information to the BSC/ANC through the BTS/AN in the message, such as PSMM for an 1× network, or RouteUpdate Message for an 1×EV-DO network. Then at time 802, the BSC/ANC sends a Loading Information Request to all the candidate carrier-sectors, exemplified in FIG. 8 as BTS/AN0, BTS/AN1, and BTS/AN2. The BSC/ANC, at time 803, then acquires this loading info from the Loading Info Response from all these candidate carrier-sectors, BTS/AN0, BTS/AN1, and BTS/AN2. At time 804, the BSC/ANC implements the carrier assignment algorithm according to the present invention to select the carrier for the assignment. Then at time 805, the BSC/ANC has the BTS/AN send a handoff message with a new active set specified based on the assigned carrier-sector (s), for example, BTS/AN1. At time 706, a New traffic channel is established with the target BTS/AN1.

The previous description of the disclosed embodiments is provided to enable a person of the ordinary skill in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A wireless communication system that provides wireless service to a mobile unit operating within a service area, the wireless communication system comprising:

at least one mobile switching center;

at least one base station controller coupled to the at least mobile switching center, wherein the at least one base station controller sets resource allocation priority and produces a carrier loading information request in response to a request-made by the mobile unit; and a plurality of base stations coupled to the at least one base station controller, each of the plurality of base stations operates on a plurality of carriers, at least one candidate base station transceiver of the plurality of base stations receiving the carrier loading information request, determining its carrier loading information based upon available forward link resources and available reverse link resources, and responding with a carrier loading information response; and wherein the at least one base station controller operates to assign the mobile unit to at least one candidate carrier within the one responding candidate base station of the plurality of base stations based upon both set resource allocation priority and received carrier loading information, wherein the at least one base station controller selects the carrier with the highest weighted priority if a corresponding loading information in the received carrier loading information exceeds a corresponding loading threshold by an excess loading, and wherein the weighted priority is inversely proportional to the excess loading, wherein the at least one base station controller selects the carrier with the highest resource allocation priority if the corresponding loading information in the received carrier loading information is less than the corresponding loading.

2. The wireless communication system of claim 1, wherein an assignment is made to a responding carrier within one of the plurality of base stations if the corresponding loading information is less than the corresponding loading threshold.

3. The wireless communication system of claim 1, wherein the mobile unit is assigned to at least one of the plurality of carriers within one of the plurality of base stations upon setting up a call.

4. The wireless communication system of claim 1, wherein the mobile unit is assigned to at least one of the plurality of carriers within one of the plurality of base stations during servicing of a call.

5. The wireless communication system of claim 1, wherein the plurality of base stations operate according to a code division multiple access (CDMA) protocol.

6. The wireless communication system of claim 5, wherein the CDMA protocol is a Wideband CDMA (WCDMA) protocol.

7. The wireless communication system of claim 5, wherein the CDMA protocol is a CDMA 1× protocol.

8. The wireless communication system of claim 1, wherein the weighted priority is directly proportional to the resource allocation priority normalized across all carriers in an area covered by the candidate base station transceiver.

9. A wireless communication system that provides wireless service. to a mobile unit operating within a service area, the wireless communication system comprising:

one packet data serving node;

at least one packet control function, coupled to the packet data serving node;

at-least one access network controller coupled to the at least packet control function, wherein the at least one access network controller setting resource allocation priority and producing a carrier loading information request in response to a request made by the mobile unit;

a plurality of base stations coupled to the at least one access network controller, each of the plurality of base stations operates on a plurality of carriers, at least one candidate base station transceiver of the plurality of base stations receiving the carrier loading information request, determining its carrier loading information based upon available forward link resources and available reverse link resources, and responding with a carrier loading information response; and wherein the at least one access network controller operating to assign the mobile unit to at least one candidate carrier within the one responding candidate base station of the plurality of base stations based upon both set resource allocation priority and received carrier loading information, wherein the at least one access network controller selects the carrier with the highest weighted priority if a corresponding loading information in the received carrier loading information exceeds a corresponding loading threshold by an excess loading, and wherein the weighted priority is inversely proportional to the excess loading, wherein the at least one network controller selects the carrier with the highest resource allocation priority if the corresponding loading information in the received carrier loading information is less than the corresponding loading.

10. The wireless communication system of claim 9, wherein an assignment is made to a responding carrier within one of the plurality of base stations if the corresponding loading information is less than the corresponding loading threshold.

11. The wireless communication system of claim 9, wherein the mobile unit is assigned to at least one of the plurality of carriers within one of the plurality of base stations upon setting up a call.

12. The wireless communication system of claim 9, wherein the mobile unit is assigned to at least one of the plurality of carriers within one of the plurality of base stations during servicing a call.

13. The wireless communication system of claim 9, wherein the plurality of base stations operate according to a code division multiple access (CDMA) protocol.

14. The wireless communication system of claim 13, wherein the CDMA protocol is a CDMA 1× Evolution Data Optimized (1×EV-DO) protocol.

15. In a wireless communication system including at least a plurality of base stations, each of the plurality of base stations operates on a plurality of carriers, a method of operation comprising:

receiving a request from a mobile unit;

determining an operational position of the mobile unit based upon the location of a base station receiving the request;

requesting resource assignment information from the plurality of base stations;

receiving resource assignment information response from the plurality of base stations;

setting net resource priority for each candidate carrier within each of the plurality of candidate base stations;

requesting carrier loading information from each of the plurality of candidate base stations;

receiving carrier loading information responses from each candidate carrier within each of the plurality of the candidate base stations;

based upon both resource allocation priority and carrier loading information responses, selecting at least one serving carrier from the candidate carriers within one of the candidate base stations, wherein selecting at least one serving carrier comprises selecting the carrier with the highest weighted priority if a corresponding loading information in the carrier loading information responses exceeds a corresponding loading threshold by an excess loading, and wherein the weighted priority is inversely proportional to the excess loading, wherein selecting at least one serving carrier comprises selecting the carrier with the highest resource allocation priority if the corresponding loading information in the received carrier loading information is less than the corresponding loading; and serving the mobile unit with the at least one serving carrier within one of the candidate base stations.

16. The method of claim 15, wherein the plurality of carriers within each of the plurality of base stations providing overlaying wireless coverage.

17. The method of claim 15, wherein an assignment is made to a responding carrier within one of the plurality of base stations if the corresponding loading information is less than the corresponding loading threshold.

18. The method of claim 15, wherein the request received from the mobile unit is for setting up a call.

19. The method of claim 15, wherein the request received from the mobile unit is for servicing a call.

20. The method of claim 15, wherein the plurality of base stations operate according to a code division multiple access (CDMA) protocol.

21. The method of claim 20, wherein the CDMA protocol is a Wideband CDMA (WCDMA) protocol.

22. The method of claim 20, wherein the CDMA protocol is a CDMA 1×protocol.

23. The method of claim 20, wherein the CDMA protocol is a CDMA 1×EV-DO-protocol.

24. A method of selecting a carrier for a mobile unit in a wireless communication network comprising a plurality of base stations, the method comprising:

receiving a request from a mobile unit;

setting net resource priority for each carrier within each of the plurality of base stations;

requesting a carrier loading information from each of the plurality of base stations;

receiving a carrier loading information response for each carrier within each of the plurality of the base stations;

selecting a carrier, wherein a carrier with a highest weighted priority is selected if a corresponding loading information in the carrier loading information responses exceeds a corresponding loading threshold by an excess loading, wherein a carrier with the net resource priority is selected if the corresponding loading information in the received carrier loading information is less than the corresponding loading, wherein the weighted priority is inversely proportional to the excess loading and directly proportional to the resource allocation priority normalized across all carriers within each of the plurality of the base stations; and serving the mobile unit with the selected carrier.

* * * * *